United States Patent

[11] 3,618,962

| [72] | Inventors | John R. Cox<br>Lakewood;<br>Joseph E. Mix, Cleveland, both of Ohio |
|---|---|---|
| [21] | Appl. No. | 12,097 |
| [22] | Filed | Feb. 17, 1970 |
| [45] | Patented | Nov. 9, 1971 |
| [73] | Assignee | The Warner & Swasey Company<br>Cleveland, Ohio |

[54] COLLET CHUCK
4 Claims, 5 Drawing Figs.

[52] U.S. Cl.......................................... 279/82,
90/11 A, 279/76, 279/97
[51] Int. Cl.......................................B23b31/10,
B23b 31/20
[50] Field of Search........................... 279/82, 97,
76, 46, 51, 64, 79; 90/11 A

[56] References Cited
UNITED STATES PATENTS
3,195,909  7/1965  Winnen....................... 279/76 X

*Primary Examiner*—William S. Lawson
*Assistant Examiner*—James F. Coan
*Attorney*—Bosworth, Sessions, Herrstrom & Cain ABSTRACT: A collet chuck having a radially movable pin therein for locking a tool such as an end mill against axial withdrawal from and turning in the collet. The pin is tapered and fits within a correspondingly tapered, radially extending hole in the collet which limits its inward movement. The pin is biased into full seating engagement with the tapered hole by a retaining spring and is adapted to be cammed radially outwardly during insertion of an end mill by a beveled end on the tool shank or by the flute contour in the case of a double ended end mill. With the collet in the chuck the inner end of the pin radially overlaps a shouldered recess on the shank of the tool and the outer end contacts the inner wall of the chuck. The pin thereby prevents axial withdrawal or turning of the tool.

PATENTED NOV 9 1971
3,618,962
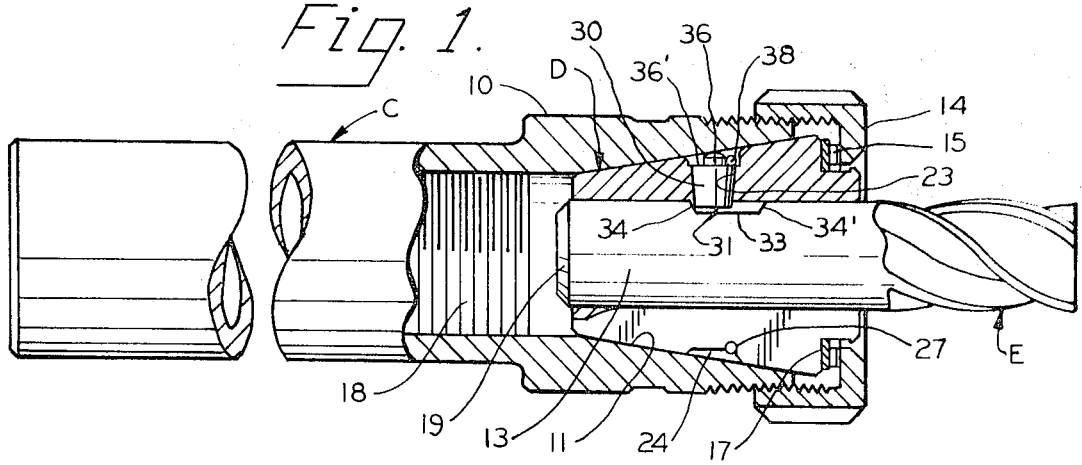
Fig. 1.
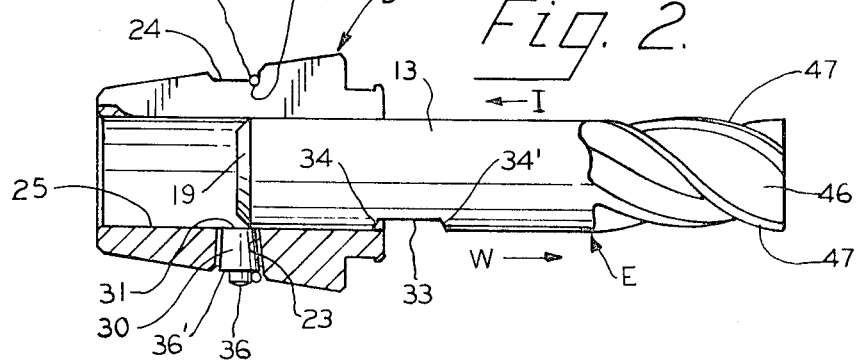
Fig. 2.
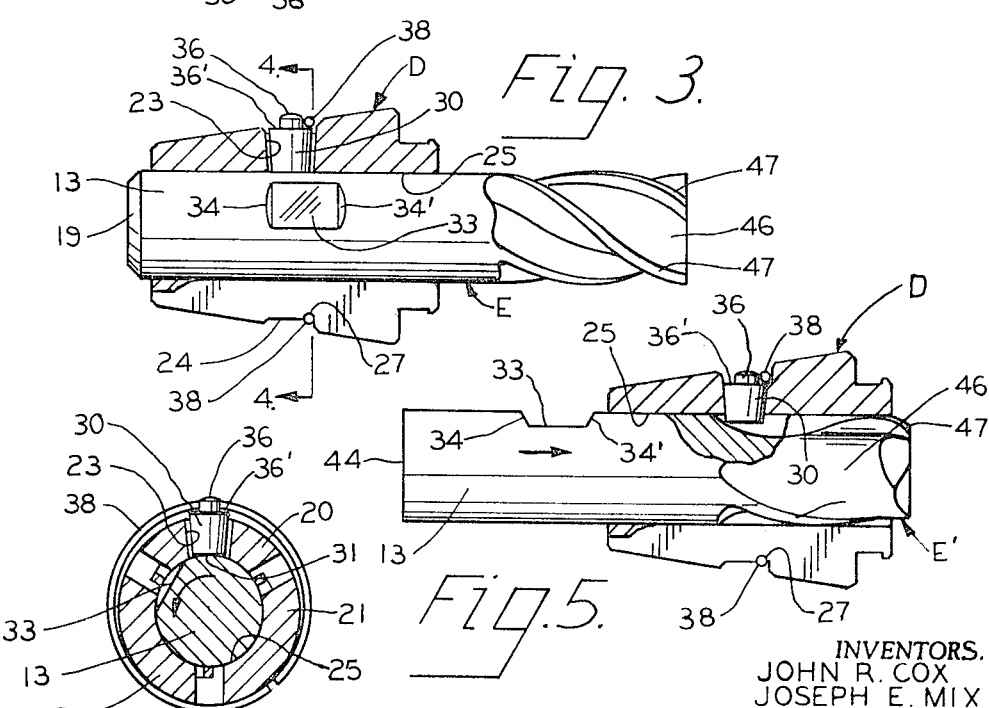
Fig. 3.
Fig. 4.
Fig. 5.
INVENTORS.
JOHN R. COX
JOSEPH E. MIX
BY Bosworth, Sessions, Herrström & Cain
ATTORNEYS.

COLLET CHUCK

BACKGROUND OF THE INVENTION

The present invention relates generally to a collet chuck and more particularly to a collet chuck having means for locking an end mill or similar tool against axial withdrawal from and rotation with respect to the collet.

An end mill is generally provided with a milling edge at one or both ends and with helical flutes having milling edges extending from the ends for a distance along the shank. The milling edges tend to be pulled into a workpiece at a rate exceeding the feed of the spindle on which the chuck is mounted. As a result, severe stresses are imposed on the tool which may cause it to be pulled out of and/or rotated with respect to the collet.

It has been proposed to employ a locking pin that extends through a radial hole in the collet and overlaps a shouldered recess on the shank of the tool to prevent withdrawal and turning of the tool. Such locking pins must be permitted to move radially in order to insert a tool and withdraw it from the collet. It is desirable to limit the amount of radial movement so that the pin is retained in the collet and automatically assumes its proper position when a tool is inserted into or withdrawn from the collet. One example of a pin retaining means intended to accomplish this purpose is a transverse pin that extends through a slot in the locking pin and permits radially inward and outward movement of the locking pin according to the diameter of the slot and the diameter of the transverse pin. This arrangement is relatively complex and expensive.

SUMMARY OF THE INVENTION

An object of the present invention is to provide a collet chuck having improved means for preventing turning and withdrawal of a tool in the collet.

A more particular object is to provide, in a collet having a radially extending locking pin, improved means for limiting the amount of radial movement of the locking pin. A further object of the invention is the provision of means for limiting the radial movement of a locking pin in a collet that is simpler and less expensive to produce than prior such means.

A preferred embodiment of our invention comprises a collet having a tapered pin mating with a correspondingly tapered radially extending hole in the collet, and spring means biasing the pin into the hole. The taper of the pin and hole limits radially inward movement of the pin and the spring means permits radially outward movement of the pin for insertion or withdrawal of a tool shank. After the tool is inserted or withdrawn the pin automatically assumes its seated position in the tapered hole.

BRIEF DESCRIPTION OF THE DRAWINGS

FIG. 1 is a longitudinal sectional view of a collet chuck incorporating the present invention showing the radial overlap of the locking pin with the shouldered recess on the shank of an end mill in the collet.

FIG. 2 is a longitudinal sectional view of a collet according to this invention and an end mill, illustrating the withdrawal and insertion of the end mill, the locking pin and shouldered recess being in longitudinal but not in transverse alignment.

FIG. 3 is a view similar to FIG. 2 but showing the shouldered recess in transverse but not in longitudinal alignment with the locking pin.

FIG. 4 is a cross-sectional view taken substantially on line 4—4 of FIG. 3 illustrating the longitudinal misalignment of the shouldered recess with respect to the locking pin.

FIG. 5 is a view similar to FIG. 3 illustrating the manner of insertion into the collet of a single ended end mill having a shank end that is not beveled.

DESCRIPTION OF THE PREFERRED EMBODIMENTS

In FIG. 1 a chuck generally designated C includes a chuck body 10 having a tapered bore 11 that cooperates with a longitudinally split collet D having an outer surface tapered to fit the bore 11 for contraction into gripping engagement with the shank 13 of a tool such as an end mill, generally designated E. Collet D is contracted by axial force applied to its outer (right, as viewed) end by means of a nosepiece assembly including a nosepiece 14 having threaded engagement with the chuck body 10, a roller bearing 15 and a thrust washer 17 interposed between the nosepiece and the outer end of the collet.

When the nosepiece 14 is tightened, force is transmitted through the bearing 15 and washer 17 to the outer end of collet D and urges the collet axially into the tapered bore 11 to effect contraction of the collet into firm gripping engagement with shank 13 of end mill E.

The recessed shank portion of chuck or toolholder C is interiorly threaded as at 18 to receive a correspondingly threaded stop member (not shown) that may be positioned to contact the end 19 of shank 13 of the end mill E to prevent axially inward movement thereof.

Collet D is preferably made in one piece, is axially slotted from opposite ends in any well-known manner, such as indicated in FIG. 4, and includes three circumferential segments 20, 21 and 22 defining a central tool-receiving bore 25. One of the segments 20, as illustrated, is provided with a radially extending hole 23 that tapers from a maximum diameter at its outer end to a minimum diameter at its inner end. A circumferentially extending flat bottomed groove 24, from which the hole 23 extends radially inwardly, is formed on the outer surface of the collet about midway between its ends. At the outer (right as viewed) edge of groove 24 is a circumferential spring receiving groove 27 which intersects tapered hole 23 at its outer (right hand in FIG. 2) edge.

A correspondingly tapered locking pin 30 is seated within the tapered hole 23 and has its inner end 31 extending into a shouldered recess 33 in shank 13 of end mill E. Recess 33 is provided with beveled shoulders 34, 34' at its axial ends. Locking pin 30 has, at its outer end, a domelike protrusion or button 36 which is adapted to contact the wall of tapered bore 11 in chuck body 10 when collet D is contracted into gripping engagement with shank 13 and also forms an annular shoulder 36' on the pin. A split spring retaining ring 38 in groove 27 overlies the shoulder 36' on pin 30 and biases the pin into seated position in the tapered hole 23 as seen in FIG. 1.

In the assembly illustrated in FIG. 1 end mill E is locked against axial withdrawal from collet D by the squared off inner end 31 of locking pin 30 contacting beveled shoulder 34 of recess 33 in the shank of the end mill. Rotation of end mill E with respect to collet D will also be prevented, after only a small amount of rotation, by contact between the inner end 31 of locking pin 30 and the bottom of recess 33. In each case pin 30 is prevented from moving radially outwardly by contact between projection 36 and the wall of bore 11 in the chuck body 10.

FIG. 2 illustrates the insertion and withdrawal of end mill E into and from collet D when the collet is separated from the chuck body 10. In discussing tool insertion and withdrawal the locking pin 30 in the collet is said to be in "longitudinal" alignment with the recess 33 in the tool shank (see FIG. 2) when the pin and recess lie substantially on the same plane through the common longitudinal center line of the collet bore and tool shank. The pin and recess are said to be in "transverse" alignment with both lie substantially on the same plane that is perpendicular to the common longitudinal centerline of the collet bore and tool shank as shown in FIG. 3. In FIG. 1 the pin and recess are aligned both transversely and longitudinally.

End mill E is normally inserted into collet bore 25 beveled shank end 19 first in the direction of the arrow I. Prior to insertion locking pin 30 is held in full seated engagement in tapered hole 23 by spring retaining ring 38 and its inner end 31 projects into the bore 25 of the collet. As the shank 13 of end mill E is inserted in the direction of the arrow I the beveled edge 19 thereof contacts the square corner of the inner end 31 of locking pin 30 and cams the pin radially outwardly against the tension of retaining ring 38 into the position shown in FIG. 2. Locking pin 30 is retained in that position by shank 13 until recess 33 in the shank is aligned both transversely and longitudinally with locking pin 30. At that point locking pin 30 is again moved into full seating engagement with tapered hole 23 by the action of spring ring 38 and projects radially into recess 33 as shown in FIG. 1.

To remove the end mill E the collet, with the end mill thereon, is first separated from chuck body 10. The end mill is then moved in the direction of the arrow W (FIG. 2), and the beveled shoulder 34 of recess 33 on the tool shank contacts the square corner of the inner end 31 of locking pin 30 and cams the pin radially outwardly against the tension of spring ring 38 until it rides on the cylindrical shank 13 as seen in FIG. 2 and is held in this position until the beveled edge 19 is withdrawn past the tapered hole 23. At that point locking pin 30 will again become fully seated in the tapered hole 23 in the manner described above and withdrawal of the tool is completed.

The end mill E may also be released from the pin 30 in collet D by rotation, for example counterclockwise as indicated in FIG. 4, from locking position to a released position shown in FIGS. 3 and 4 where recess 33 is out of longitudinal alignment with locking pin 30. In so rotating shank 13 the pin 30 is cammed radially outwardly by the flat bottom of recess 33 engaging the end 31 of the pin. This release procedure is particularly adapted for use with tools in which the shoulders 34, 34' of recess 34 are not sufficiently inclined to cam the pin 30 outwardly upon direct axial withdrawal of the tool.

The end mill E illustrated in FIGS. 1 to 4 is of the single-ended type with its shank end beveled for camming action on the square end 31 of locking pin 30 during insertion of the end mill into a collet. As noted above, end mills may also be double ended, that is, having milling cutters at both ends. In such case the relieved areas 46 between the helical flutes 47 of the tool serve to cam-locking pin 30 radially outwardly when a double-ended end mill is inserted into collet D.

The camming action of the relieved surfaces 46 is illustrated in FIG. 5 where a single-ended end mill E' having a square, nonbeveled shank end 44 is being inserted into collet D in the direction of the arrow. It is apparent that both double-ended end mills and single-ended end mills having a beveled shank end as illustrated in FIGS. 1 to 4 may be inserted into the collet from either direction with either the beveled end 19 or the tapered surface flute relief 46 camming the locking pin 30 outwardly.

The single ended end mill E' shown in FIG. 5, however, can be inserted only in the direction of the arrow since there is no beveled camming surface at its shank end 44. The fact that the flute relief surfaces 46 of an end mill will cam the locking pin 30 radially outwardly eliminates the necessity for beveled camming surfaces at either the inner end 31 of locking pin 30 or at the shank end 44 of a single-ended end mill.

In the collet described above and illustrated in FIGS. 1 to 5 the combination of tapered hole and tapered pin with a spring retaining ring to bias the pin into the hole provides a simple and reliable means for retaining the pin in the collet while allowing it limited radial movement for insertion and withdrawal of a tool. After the tool is inserted or withdrawn the pin automatically assumes its seated position in the tapered hole. Rotation of the pin in the tapered hole is not limited by the engagement of spring ring 38 with the shoulder 36' on pin 30 and any such rotation as may occur does not affect the operation of the collet chuck in any way.

While the illustrated embodiment of our improved collet chuck has been described and explained in considerable detail it will be understood that variations and modifications may be made in the invention without departing from its scope and spirit. We do not, therefore, wish to be limited to the specific device herein illustrated and described but claim as our invention all embodiments thereof coming within the scope of the appended claims.

We claim:

1. A split radially resilient collet having a tapered outer surface, a tool-receiving bore extending axially therethrough and a tapered hole extending radially from the outer surface of said collet into said bore, said hole having its largest diameter adjacent said outer surface of the collet, a tool-locking pin tapered to fit said tapered hole and disposed therein, the length of said pin being such that when seated in said tapered hole in said collet the inner end of said pin extends into said axial bore and the outer end of said pin lies substantially at said outer tapered surface of said collet, and spring means supported on said collet and engaging said pin for biasing said pin into said hole while permitting limited radially outward movement of said pin.

2. A collet as defined in claim 1 which has a circumferential groove on its outer surface which intersects said hole at the outer end thereof and in which said spring means comprises a resilient split ring that fits within said groove and overlies said pin and said hole.

3. A collet as defined in claim 2 in which the outer end of said pin has a projection therein which forms an annular shoulder adjacent the outer end of said pin and said split ring overlies said annular shoulder.

4. In a chuck including a body having a bore, a collet arranged to be radially contracted when axially moved in said bore, and means on said body for axially moving said collet, the improvement which comprises said collet having a radially inwardly extending tapered hole, a correspondingly tapered pin mating with said hole, the inner end of said pin being adapted to overlap a recess on the shank of a tool in said collet to prevent withdrawal of the tool, the radially outer end of said pin having a projection thereon forming an annular shoulder on said pin, said projection being adapted to contact the wall of said bore in said body to prevent radially outward movement of said pin when said collet is in said bore, said collet having a circumferential groove that intersects said tapered hole, and a split spring ring in said groove overlying said shoulder and urging said pin into said hole while permitting radially outward movement and rotation of said pin.

* * * * *